(12) United States Patent
Despault et al.

(10) Patent No.: US 7,132,036 B2
(45) Date of Patent: Nov. 7, 2006

(54) DEWATERING OF A PAPER WEB IN A PRESS SECTION OF A PAPERMAKING MACHINE

(75) Inventors: Marc P. Despault, Ottawa (CA); Brady S. Patterson, Kanata (CA); Graham Jackson, Woodlawn (CA)

(73) Assignee: AstenJohnson, Inc., Charleston, SC (US)

( * ) Notice: Subject to any disclaimer, the term of this patent is extended or adjusted under 35 U.S.C. 154(b) by 110 days.

(21) Appl. No.: 10/918,028

(22) Filed: Aug. 12, 2004

(65) Prior Publication Data

US 2005/0136769 A1    Jun. 23, 2005

Related U.S. Application Data

(60) Provisional application No. 60/532,194, filed on Dec. 23, 2003.

(51) Int. Cl.
*D21F 7/08* (2006.01)
*B32B 5/08* (2006.01)
*B32B 5/26* (2006.01)

(52) U.S. Cl. ............... 162/358.2; 162/205; 162/358.1; 162/900; 442/324; 442/329; 442/415

(58) Field of Classification Search ............... 162/116, 162/117, 205, 206, 358.1, 358.2, 348, 900, 162/902, 903, 904; 139/383 A, 425 A, 383 AA; 442/182, 268, 270–275, 301, 328, 329, 381, 442/383, 389, 392, 402, 403, 407, 414, 415, 442/320–326

See application file for complete search history.

(56) References Cited

U.S. PATENT DOCUMENTS 3,392,079 A    7/1968    Eugene (Continued)

FOREIGN PATENT DOCUMENTS

EP    1 413 673    4/2004

(Continued)

OTHER PUBLICATIONS

Wahlstrom, B., 1960. *A Long Term Study of Water Removal and Moisture Distribution on a Newsprint Machine Press Section.* Paper presented at 46th Annual Meeting Technical Section, Canadian Pulp and Paper Association (Montreal, QC, Jan. 26-29, 1960), pp. 271-327.

(Continued)

*Primary Examiner*—Eric Hug
(74) *Attorney, Agent, or Firm*—Volpe and Koenig, PC

(57) ABSTRACT

A press felt for use in the press section of a papermaking machine. The felt is comprised of at least one base fabric to which at least one batt layer is attached by needling or another suitable method. A woven or nonwoven fibrous scrim may be included between the base fabric and the at least one layer of batt material, or between any two or more layers. At least one of the base fabric, the at least one layer of batt material, or the fabric scrim is comprised of polymeric fibers which are blended with fibers whose modulus of elasticity is substantially less than the modulus of elasticity of the polymeric fibers. Press felts manufactured in accordance with the teachings of the invention provide a retarded elastic spring-back in the vertical (or Z) direction of the felt following the mid-nip point in the press section. This retarded elastic spring-back advances the post nip separation position of the felt and the paper web towards the mid-nip point, thus reducing rewetting of the paper sheet. Fibers comprised of regenerated celluosics, such as viscose rayon, have proven effective for use as the low modulus of elasticity component fibers in the press fabrics of the invention.

12 Claims, 2 Drawing Sheets

U.S. PATENT DOCUMENTS

| | | | |
|---|---|---|---|
| 4,162,190 | A | 7/1979 | Ashworth |
| 4,323,622 | A | 4/1982 | Gladh et al. |
| 4,439,481 | A | 3/1984 | Johnson et al. |
| 4,520,059 | A | 5/1985 | Worrall et al. |
| 4,529,643 | A * | 7/1985 | Lundstrom ............ 442/275 |
| 4,781,967 | A | 11/1988 | Legge et al. |
| 5,135,802 | A | 8/1992 | Gstrein et al. |
| 5,204,171 | A * | 4/1993 | Eschmann ............ 442/195 |
| 5,232,768 | A | 8/1993 | Eklund et al. |
| 5,268,076 | A | 12/1993 | Best et al. |
| 5,328,757 | A | 7/1994 | Kenney et al. |
| 5,360,656 | A | 11/1994 | Rexfelt et al. |
| 5,864,931 | A | 2/1999 | Best et al. |
| 6,140,260 | A | 10/2000 | Johnson et al. |
| 6,159,880 | A | 12/2000 | Schiel |
| 6,171,446 | B1 | 1/2001 | Diaz-Kotti |
| 6,592,636 | B1 | 7/2003 | Joyce |
| 6,616,812 | B1 | 9/2003 | Beck |

FOREIGN PATENT DOCUMENTS

| | | |
|---|---|---|
| GB | 2 332 916 | 7/1999 |
| JP | 2 992 767 | 12/1999 |
| JP | 2005256227 | 9/2005 |
| WO | WO 99/32715 | 7/1999 |
| WO | WO 01/27387 | 4/2001 |
| WO | WO 03/023106 | 2/2003 |

OTHER PUBLICATIONS

Morrison, R.E. 1969. *Felt Capillary Structure and Water Removal*. Pulp and paper Magaine, vol. 70, No. 3 (Feb. 1969), pp. 58-62.

Wahlstrom, B. 1969. *Our Present Understanding of the Fundamentals of Pressing*. Abbreviated from Pulp & Paper Magazine of Canada, vol. 70, No. 10 (Oct. 3, 1969), pp. 76-96.

Wiseman, Nick. *The Effect of Felt Properties on the Pressing of Paper*. Pulp and Paper Canada, vol. 77, No. 9 (Sep. 1978), pp. T149-T153.

Bliesner, William C. 1978. *Sheet Water Removal In a Press: the Role of Wet Felt Properties*. Pulp and Paper, vol. 52, No. 11 (Oct. 1978), pp. 76-79.

Beck, David A. 1986. *Re-examining Wet Pressing Fundamentals: a Look Inside the Nip Using Dynamic Measurement*. From Proceedings TAPPI Engineering Conference (Atlanta, Ga: Sep. 22-25, 1986), Book 1, pp. 105-115.

Palokangas, Antti. 1990. *Press Felt to Increase Dryness by Avoiding Rewetting*. Paper presented at Modern Technologies in Pressing and Drying, Pira, (Bournemouth, UK, Nov. 6-8, 1990, vol. 1), 8 pp.

Talja, R.; Honkalampi, P. 1994. *Compressiblity and Flow Resistance of Porous Medium*. Paper presented at 80th Annual Meeting Technical Section, Canadian Pulp and Paper Association (Montreal, QC, Feb. 1-2, 1994), Preprints A, pp. A187-A190.

Antos, Dave. 1995. *Paper Machine Clothing Developments Aimed at Increased Production and Quality*. Paper Age, (Jun. 1995), pp. 10-14.

Mercer, Colin. 1998. *Use of Membrane Composites in Press Felts Enhance Pressing Efficiency*. Paper presented at 84th Annual Meeting Technical Section, Canadian Pulp and Paper Association (Montreal, QC, Jan. 27-30, 1998), Preprints B, pp. B197-B204.

Shidara, Toyohisa. 2000. *Roles of press felt in press section of paper machine—dewatering mechanism and felt design*. Japan Tappi Journal, vol. 54, No. 5 (May 2000), pp. 22-28.

Patterson, B. 2003. *Enhanced Water Removal Pressing*. Paper presented at 89th Annual Meeting Technical Section, Pulp and Paper Technical Association of Canada, (Montreal, QC, Canada, 27-30 Jan. 2003), session 4B-2, 5 pp. Montreal, Canada.

* cited by examiner

DEWATERING OF A PAPER WEB IN A PRESS SECTION OF A PAPERMAKING MACHINE

CROSS-REFERENCE TO RELATED APPLICATIONS

The present application claims the benefit of U.S. Provisional Application Ser. No. 60/532,194, filed on Dec. 23, 2003, which is incorporated by reference herein as if fully set forth.

BACKGROUND

The present invention relates to improved dewatering of a paper web in a press section of a papermaking machine. More particularly, the invention relates to press felts that incorporate or are arranged to provide a reduced or retarded spring back elasticity after the mid nip point between the press rolls to reduce rewetting of the paper web.

Press felts are endless belts which may contain a seam and which are used to convey an embryonic paper web from the forming section, through the press and into the dryer section of a papermaking machine so as to dewater and ultimately dry the paper product so that it is suitable for use. In the press section, at least one press nip is typically provided between either a pair of rotating cylindrical rollers, or a roller and concave shoe. The embryonic paper web passes through the at least one press nip laid either upon a single felt, or sandwiched between at least two press felts. As the web passes through the at least one press nip, water is expressed from it and passes into the at least one press felt.

Papermaker's press felts are well known. See, for example, U.S. Pat. No. 4,199,401 to Liu et al., U.S. Pat. No. 4,356,225 to Dufour, U.S. Pat. No. 4,414,263 to Miller et al., U.S. Pat. No. 4,806,413 to Penven, U.S. Pat. No. 5,360,656 to Rexfelt et al., and U.S. Pat. No. 5,864,931 to Best et al. These felts are usually comprised of a woven base fabric (typically formed of nylon or similar polymeric yarns) to which is attached, generally by needling, at least one layer of a pre-tacked staple fiber web, commonly referred to as a batt. Typical press felt batts will usually include between one and about 5 or more layers of a pre-tacked staple fiber web needled onto a first planar surface of the base fabric (usually the surface which, when in use, will be in contact with the paper sheet, and is hereafter referred to as the "PS") to form a PS batt, and from none to one or more layers needled to the opposite planar surface (which when in use will be in contact with the equipment of the paper machine, and is hereafter referred to as the "MS") to form the MS batt. The staple fibers used to form either or both the MS and PS batt are typically made from one or more nylons, polyesters or other polymeric materials such as are commonly employed in the manufacture of industrial textiles.

The batt provides a smooth surface for the paper web and a void volume into which water, which has been expressed from the paper web at the press nip, can be received. The base fabric provides some additional void volume, as well as a stable structure to which the batt can be attached. The base fabric is typically comprised of interwoven polymeric monofilament or multifilament yarns to which the batt is attached, generally by needling or other entanglement process such as is known in the art.

After the paper web has been pressed in at least one nip in the press section, it will still contain an appreciable amount of water, as much as from 30% to about 60% or more by weight. This remaining water must now be removed in the dryer section of the papermaking machine in order to provide a paper product. The final drying of the paper product is typically carried out by evaporative means, which requires a large amount of energy. This adds substantially to the cost of manufacturing the paper product. Generally, a 1% increase in the dryness of the sheet exiting the press section will translate into about a 4% energy savings in the dryer section. It is also possible that the speed of the paper machine may have to be reduced or at least limited due to the evaporative capacity of the dryer section.

The generally accepted theory of operation of a papermaking machine press section is described in Wahlstrom, P. B., A Long Term Study of Water Removal and Moisture Distribution On A Newsprint Machine Press Section, Parts I and II, Pulp and Paper Mag. Can., 60, No. 8: T379–T401 (August 1960); Id., No. 9: T418–T451 (September 1960). Briefly, on the entrance side of the nip, water is removed by compression and the resulting hydraulic pressure to a maximum dryness, which is achieved at the mid nip point. However, rewetting of the paper web occurs through capillary action that draws water back from the press felt once the paper web has passed through the nip.

There have been a number of attempts to reduce this rewetting, such as by using hydrophilic or hydrophobic fibers or coatings in or on press felts, or the introduction of an anti-rewetting layer on or between the mid layers of the press felt batt. However, while such measures have resulted in limited improvements, there is still the need for improved dewatering in the press section to reduce production costs.

Thus, it would be highly desirable if the water removal in the press section could be improved to increase the amount of water transported away from the paper product as it passes through the press section.

SUMMARY

In accordance with the present invention, the inventors have determined that the dewatering performance of the press section of a papermaking machine can be improved to remove from about 3% to 8% more water from the paper web by advancing a paper web separation point from the press felt(s) and/or upper roll to limit post mid nip point rewetting of the paper web.

In accordance with one embodiment of the invention, an elastic spring back of the press felt after the mid nip point is retarded in order to advance the paper web separation point towards the mid-nip and point of maximum dewatering. This is accomplished by incorporating materials with reduced elasticity into the press felt. Preferably, a low elasticity staple fiber is blended with known polymeric staple fibers to form the batt and/or the base fabric of the press felt. In a preferred embodiment, it has been determined that the use of regenerated cellulosic staple fibers blended with polymeric staple fibers in the batt material layer(s) provides the desired advance in the paper web separation point by retarding the post nip elastic spring back of the press felt.

In another embodiment of the invention, a press felt for use in a papermaking machine or other dewatering application (commonly referred to herein as for use on a papermaking machine) is provided. The press felt includes a base fabric layer and a staple fiber batt material layer attached to the base fabric layer. The staple fiber batt material layer includes polymeric stable fibers uniformly blended with low elasticity staple fibers having a modulus of elasticity that is 25% or less than a modulus of elasticity of the polymeric stable fibers. The polymeric staple fibers and the low elasticity staple fibers having a dtex of at least about 1.1 to about 44. This press felt provides a retarded elastic spring back so that the post nip paper web separation position is advanced in order to improve dewatering performance.

BRIEF DESCRIPTION OF THE DRAWINGS

The present invention will be explained in more detail in connection with the drawings in which presently preferred embodiments are shown.

DETAILED DESCRIPTION OF THE PREFERRED EMBODIMENTS

Figure 1:
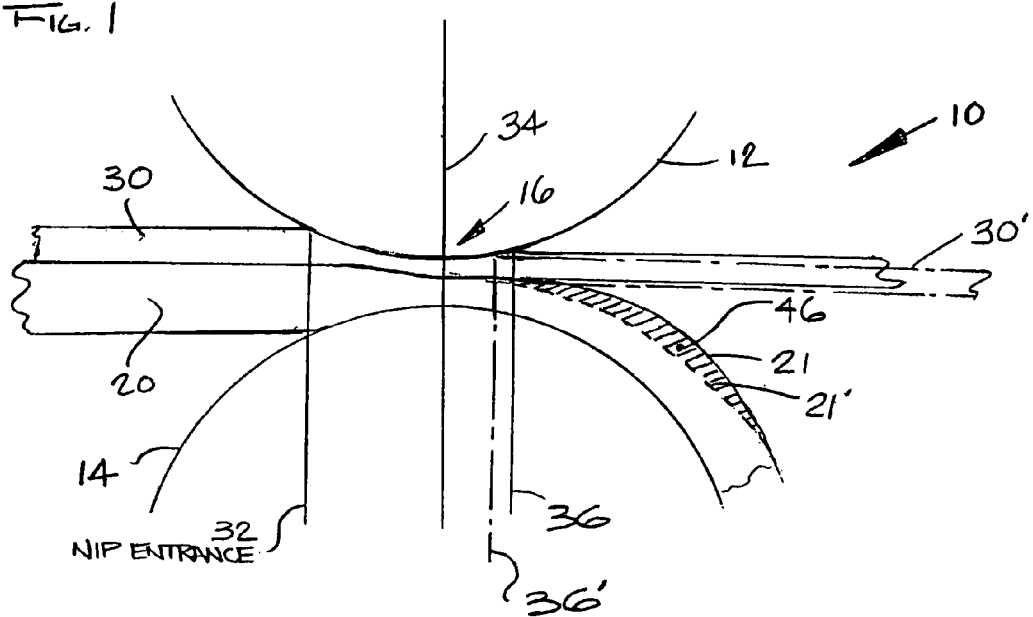
FIG. 1 is a schematic cross-section of a nip in the press section of a papermaking machine in accordance with the teachings of the invention.

Certain terminology is used in the following description for convenience only and is not considered limiting. Words such as "up", "down", top and "bottom" designate direction in the drawings to which reference is made. This terminology includes the words specifically noted above, derivatives thereof and words of similar input. Additionally, the terms "a" and "one" are defined as including one or more of the referenced data unless specifically noted.

Referring to FIG. 1, a portion of a press section 10 of a papermaking machine is shown. The press section 10 includes upper and lower rolls 12, 14 which create a nip 16. A press felt 20 is supported by the lower roll 14, and transports an embryonic paper web 30 from the forming section of the papermaking machine (not shown) to the nip 16 for dewatering. The paper web 30 and the press felt 20 enter the nip 16 at a nip entrance point, indicated by line 32. The paper web 30 and the press felt 20 are compressed in the nip 16 to a point of highest compression at the mid nip point, indicated by line 34, where water is expressed from the paper web 30 into the press felt 20, and can then be further removed through vacuum openings in the lower roll 14.

As soon as the paper web 30 and press felt 20 pass the mid nip point 34, the elasticity of the press felt 20 allows it to spring back to its original thickness, as indicated by the paper side surface (PS), which is illustrated for the known press sections as 21, and for the press section in accordance with the present invention as 21'. This expansion of the press felt allows rewetting of the paper web 30 from the press felt 20 through capillary action until the paper web 30 separates from the press felt 20, as indicated at line 36' for the present invention and 36 for the prior known press sections.

Figure 2:
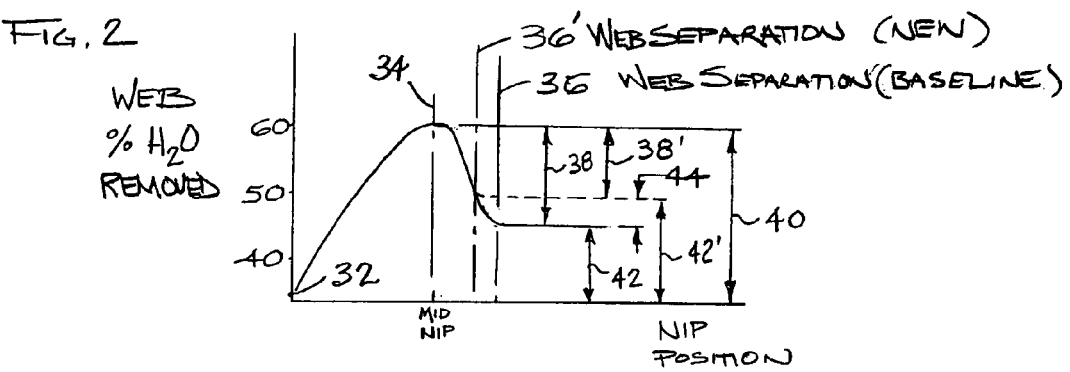
FIG. 2 is a graph illustrating the dewatering performance of the press section shown in FIG. 1.

FIG. 2 shows the percentage of water removed from the web 30 as it passes through the nip 16. Typically the embryonic paper web 30 enters the nip entrance 32 with about 35% to 40% of the water removed. As the paper web 30 is compressed by the nip 16, the water removed from the web is up to about 60% at the mid nip point 34 in the last presses, prior to entering the dryer section of the papermaking machine. The rewetting that occurs post mid nip 34 generally results in the paper web 30 having about 40% to 46% of the moisture removed prior to the paper web 30 proceeding to the dryer section of the papermaking machine. This rewetting of 14% to 20%, illustrated at 38, means that although the mid nip moisture removed, indicated at 40, was 20% to 25%, the actual net gain 42 in moisture removal in the press section was only in the range of about 5% to 8%.

According to the invention, this can be improved to a net gain of moisture removal of 10% to 15%, as indicated at 42' by advancing the separation point 36' of the paper web, indicated as 30' for the present invention, from the press felt 20 from 36 to 36', as shown in FIGS. 1 and 2, to reduce the rewetting, as indicated at 38' in FIG. 2, and maintain more of the mid nip 34 moisture removal. This results in a net gain of 2% to 7% or more of moisture removed in accordance with the present invention, as indicated at 44 over the prior known press sections.

The separation point 36' is advanced according to the invention by retarding an elastic spring back of the press felt 20 after the mid nip point 34, as indicated by hatching 46 in FIG. 1, between the PS surface 21 of the prior known press sections and 21' in accordance with the present invention. In one preferred embodiment, the spring back is retarded by providing a press felt 20 with a low elasticity batt material, as described in further detail below. This can be accomplished in accordance with the invention by providing at least one paper support side (PS) batt layer comprised of low elasticity staple fibers, such as regenerated cellulosic staple fibers and/or such low elasticity staple fibers blended with polymeric staple fibers, such as nylon 6 or nylon 6/6. In accordance with the invention, low elasticity refers to fibers having an elasticity that is 25% or less than the elasticity of nylon 6 stable fibers under operating conditions in the press section (i.e., wet). In a preferred embodiment, viscose rayon is used as the regenerated cellulosic material.

Figure 3:
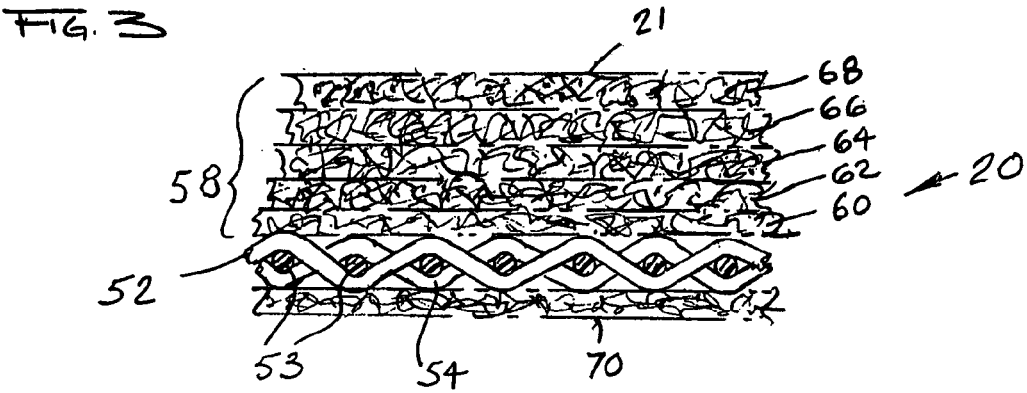
FIG. 3 is a schematic cross-section of a press fabric being constructed in accordance with the teachings of the invention.

Referring to FIG. 3, the press felt 20 in accordance with the present invention is schematically illustrated. The press felt 20 includes a base fabric layer 52 and at least one layer of a staple fiber batt 58 connected to the base fabric layer 52.

Preferably, the at least one layer of staple fiber batt 58 which comprises a plurality of layers of staple fiber batt material 60, 62, 64, 66, 68, are located on the PS 21' of the base fabric 52. One or more layers of staple fiber batt material 70 may also be located on the MS of the base fabric 52, as shown in FIG. 3. The staple fiber batt material is preferably comprised of between 20% to 100% by weight of the low elasticity staple fiber, such as a regenerated cellulosic staple fiber and from 80% to 0% by weight of a polymeric staple fiber. These staple fiber batt material layers 60, 62, 64, 66, 68 are preferably carded into batt layers having a desired density and connected to the base fabric layer 52 by a needling process of the type known in the art. Preferably, each of the staple fabric batt material layers 60, 62, 64, 66, 68 are comprised of between 20% to 80% by weight of the regenerated cellulosic staple fabric and from 80% to 20% by weight of the polymeric staple fabric. More preferably, each of the staple fabric batt material layers 60, 62, 64, 66, 68 is comprised of between 50% to 80% by weight on the regenerated cellulosic staple fabric and from 50% to 20% by weight of polymeric staple fabric. In a most preferred embodiment which has been subject to extensive testing, each of the staple fiber batt material layers 60, 62, 64, 66, 68 are comprised of about 50% by weight of the regenerated cellulosic staple fabric and about 50% by weight of the polymeric staple fabric. The separate layers of staple fiber batt material 60, 62, 64, 66, 68 are represented in FIG. 3 prior to needling where the distinct layers can be seen.

Figure 4:
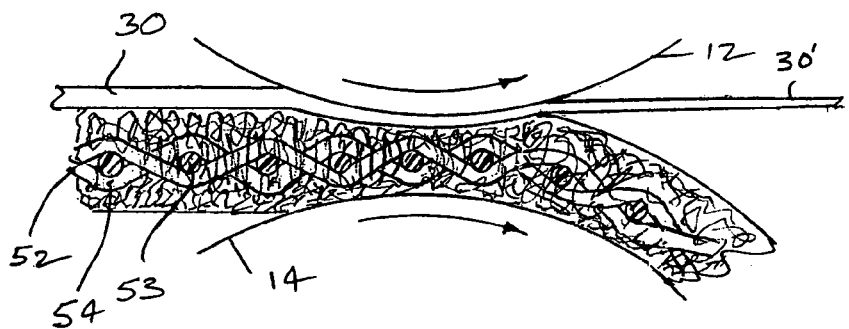
FIG. 4 is a cross-sectional view showing the press fabric with a paper web being formed thereon passing through the nip of two press rolls in the press section of a papermaking machine.

After needling, as shown in FIG. 4, a uniform more dense press felt 20 is formed with the staple fibers of the at least one layer of staple fiber batt 58 being anchored into the base fabric 52 through the needling process.

In the preferred embodiment, the low elasticity staple fiber in the staple fiber batt material 60, 62, 64, 66, 68 has a dtex from at least about 1.1 to about 44. When a plurality of layers of staple fiber batt material 60, 62, 64, 66, 68 are utilized, as shown in FIG. 3, it is preferred that the low elasticity staple fiber in the layer of staple fiber batt 68 located on the PS of the press felt 20 has a smaller size than the staple fiber of batt material of an intermediate layer of the staple fiber batt material 60, 62 adjacent to the base fabric 52. In one preferred embodiment, the low elasticity staple fibers in the PS batt layers 66, 68 have a dtex of about 2 to about 6 and the low elasticity fibers of the intermediate batt layer 60, 62 have a dtex of 8 to about 20. While these low elasticity staple fiber sizes have proven successful, applicants have also achieved improvements in dewatering by utilizing low elasticity staple fibers of the same size in each of the layers of staple fiber batt material 60, 62, 64, 66, 68. Accordingly, the sizes can be adjusted based on the particular application.

Preferably, when a plurality of staple fiber batt material layers 60, 62, 64, 66, 68 are used in the construction of the press felt according to the invention, all of the PS batt layers 58 are comprised of a bend from about 20% to about 100% by weight of low elasticity, preferably regenerated cellulosic, staple fiber and from about 80% to about 0% by weight of the polymeric stable fiber. Bicomponent yarns wherein the sheath is comprised of a low elasticity material such as polyurethane 7 or the like may also be suitable in the practice of the invention. It has been found that by providing a uniform mix of the low elasticity staple fibers throughout the batt material layers, better dewatering results are obtained. However, it would also be possible to provide one or more of the intermediate layers formed entirely of a polymeric staple fiber near or adjacent to the base fabric 12, if desired.

It has been found in connection with the invention that if the regenerated cellulosic staple fibers and the polymeric staple fiber yarns have too small of a size, the performance of the fabric may be compromised. Accordingly, in the most preferred embodiments of the invention, the regenerated cellulosic staple batt fibers have a dtex of at least 3.

Preferably, at least a portion of the regenerated cellulosic staple fibers are located at or near the PS 21' of the press felt 52. In this embodiment, the PS staple fiber batt material layers 66, 68 generally comprise a uniform distribution of the regenerated cellulosic staple fibers with the polymeric staple fiber. This blending can take place through mixture of the staple fibers prior to the fibers being carded to form the batts. In one preferred embodiment, the polymeric staple fibers and the regenerated cellulosic staple fibers have approximately an equal size. For example, both the regenerated cellulosic staple fibers and the polymeric staple fibers have a dtex of from about 3 to about 6.

The regenerated cellulosic staple fiber material is preferably viscose rayon, and may be solid, hollow or otherwise shaped, such as Viloft® available from Courtaulds. It has been found that regenerated cellulosic fibers have a low elasticity and which are resistant to fibrillation are preferred for this use. Polymeric staple fibers comprised of polypropylene, polyethylene terephthalate and the like, may be suitable for blending in the present invention.

Preferably, the regenerated cellulosic staple fibers are Merge 8142 viscose rayon having a dtex of about 3.3 available in about 2 inch lengths from Lenzing Fiber Corp. of Charlotte, N.C. Similar viscose rayon staple fibers may provide comparable results.

Preferably, the polymeric fiber is comprised of one or more of nylon 6, nylon 6/6, nylon 6/10, nylon 6/11 or nylon 6/12. Alternatively, it may comprise one of polypropylene (PP), polyethylene terephthalate (PET) or other polymeric fiber materials such as commonly used in industrial textiles. Preferably, the dtex of both is at least about 3, and the regenerated cellulosic staple fiber is viscose rayon. Even more preferably, the regenerated cellulosic fiber is non-fibrillatable. Optionally, the regenerated cellulosic fiber is flame retardant to assist with processing.

In a preferred embodiment, the staple fiber batt material includes a melt fusible polymeric bi-component staple fiber. This allows the batt material to not only be anchored to the base fabric 52 by needling but also allows heat treatment of the fabric to further lock the fibers of the staple fiber batt material in place to reduce shedding.

Figure 5:
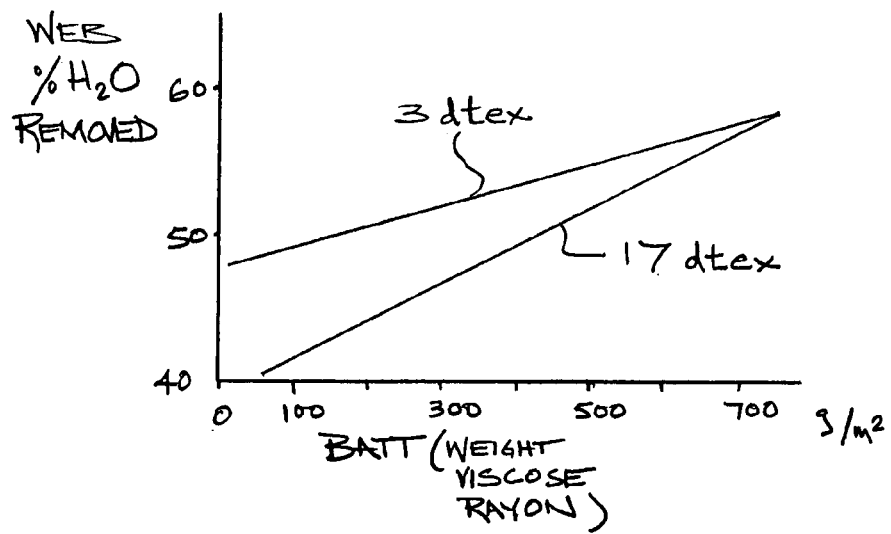
FIG. 5 is a graph showing the effect of the size of the regenerated cellulosic staple fiber on dewatering performance.

Referring to FIG. 5, preferably a weight of the low elasticity staple fiber in the staple fiber batt 58 in the press felt 20 is from about 75 to about 1000 gsm (grams per square meter). While the dtex of the low elasticity staple fibers does have some effect on the amount of water removed from the paper web 30', with the smaller dtex fibers providing higher moisture removal at lower densities, it has been found that the dtex of the low elasticity fibers becomes less of a factor as the density is increases, to a point where the dtex does not appear to be a factor for densities of 700 gsm and higher.

Preferably, a weight of the low elasticity staple fiber in the staple fiber batt 58 in the press felt 20 is about 300 to about 700 gsm. In a most preferred embodiment of the invention, a weight of the low elasticity fiber in the staple fiber batt 58 for the press felt 20 is from about 350 to about 700 gsm. This weight is preferably achieved by providing multiple layers of staple fiber batt material 60, 62, 64, 66, 68 on the PS 21' of the base fabric 52.

Additionally, one or more layers of staple fiber batt material 70 which may be comprised of polymeric fibers on regenerated cellulosic staple fibers is/are provided on the machine side (MS). The weight of each of these layers is typically in the range of 50 to 100 gsm. By constructing the felt with multiple layers of staple fiber batt material 60, 62, 64, 66, 68 and 70, further variations in construction can be obtained such as varying the dtex of the of staple fiber batt material in the PS layers 26, 28 in comparison to the intermediate layers 60, 62, 64. However, it is preferred that each of the PS layers include some of the low elasticity staple fiber batt material.

In accordance with another aspect of the invention, further improvements in dewatering can be obtained wherein at least a portion of the base fabric 52 includes a regenerated cellulosic material. Preferably, at least some of the CD yarns 53 of the base fabric 52 are at least partially comprised of a regenerated cellulosic material. The CD yarns 53 can comprise monofilaments comprised of a regenerated cellulosic material. Alternatively, the CD yarns 53 can be formed as multifilaments that include regenerated cellulosic fiber filaments which may be mixed with polymeric fiber filaments. The filaments preferably have an individual dtex of about 6 to 15. The multifilament preferably has a weight in a range of 200 to 400 tex. In a preferred embodiment, the multifilaments are either entirely comprised of viscose rayon or are comprised of a rayon component blended with e.g. nylon, or some other suitable polymer. Alternatively, the regenerated cellulosic can comprise cotton, flax, hemp or jute or similar fibers.

Additionally, the CD yarns 53 can also be formed as cabled monofilaments. The cabled monofilaments preferably include monofilaments formed of a polymer and monofilaments formed of a regenerated cellulosic material, such as viscose rayon. The individual monofilaments preferably have a diameter on the order of 0.05 to 0.3mm, and more preferably have a diameter of about 0.2mm. The number of monofilaments used in each "cable" is preferably on the order of 4 to 10. However, the size and number of monofilaments can be varied based on the particular application.

Preferably, at least some of the CD yarns 53 comprise the monofilaments, multifilaments or cabled monofilaments that are comprised at least partially of the regenerated cellulosic material, so that approximately 20% to 100% by weight of the CD yarns 53 is comprised of the regenerated cellulosic material. In order to maintain the strength of the base fabric 12, it is preferred that at least some of the CD yarns 53 are comprised at least partially of a polymeric material, such as nylon. Alternatively, certain ones of the CD yarns 53 can be formed entirely of a polymeric material.

It is also possible to incorporate a regenerated cellulosic material into the MD yarns 54, through the use of multifilaments or cabled monofilaments, as discussed above. In such applications, it is preferred that at least some of the MD yarns 54, or some of the filaments in MD multifilaments or some of monofilaments in MD cabled monofilaments comprise nylon or another suitable polymeric material having the desired strength and mechanical properties required to provide the necessary strength and elongation resistance required for a press felt.

While the base fabric 12 is preferably a woven fabric, it is also possible to use a non-woven fabric as the base fabric which comprises polymeric fibers and regenerated cellulosic staple fibers. Additionally, a woven or non-woven scrim of the low elasticity stable fiber material can be located between the staple fiber layers 60, 62, 64, 66, 68. As used herein, "scrim" is defined as a light weight woven or nonwoven textile such as a mesh or a similar fabric.

In accordance with the invention, further improvements in reducing re-wetting of the paper web 30' after it has passed through the nip 16 of the press rolls 12, 14 are provided if a hydrophobic surface treatment is applied to the PS of the batt 58 or to at least a portion of the low elasticity staple fibers in the staple fiber batt material layers 60, 62, 64, 66, 68 can be coated prior to carding and/or prior to needling. While this appears counterintuitive, it is believed that improved capillary action for removing water from the PS of the press felt 20 results from the hydrophobic treatment. In testing conducted on press felts in accordance with the invention, hydrophobic treatment resulted in approximately 1% better moisture removal from the paper web 30'.

While the preferred embodiments of the invention have been described in detail, the invention is not limited to these specific embodiments described above which should be considered as merely exemplary. Further modifications and extensions of the present invention may be developed and all such modifications are deemed to be within the scope of the present invention as defined by the appended claims.

The invention claimed is:

1. A method of improving dewatering of a paper web in a press section of a papermaking machine, comprising:
    forming a press felt with a low elasticity batt material including polymeric staple fibers uniformly blended with low elasticity staple fibers having a modulus of elasticity that is less than 25% of a modulus of elasticity of the polymeric staple fibers, and the fibers at the paper support side (PS) consisting of fibers having a dtex of at least about 1.1;
    providing a nip between first and second press rolls in the press section of a papermaking machine, with the press felt extending through the nip;
    transferring an embryonic paper to the press felt;
    conveying the embryonic paper web into the nip on the press felt; and
    advancing a paper web separation point from the press felt to limit rewetting of the paper web after a mid nip point due to retarding an elastic spring back of the press felt after the mid nip point.

2. The method of claim 1, further comprising:
    forming the press felt with at least one PS batt layer comprised of regenerated cellulosic staple fibers.

3. The method of claim 2, further comprising:
    forming the press felt with the at least one PS batt layer comprising a blend of the regenerated cellulosic staple fibers and polymeric staple fibers.

4. The method of claim 3, further comprising providing the regenerated cellulosic staple fibers having a dtex from at least about 1 to about 44.

5. A press felt for use in a papermaking machine, comprising:
    a base fabric layer and a staple fiber batt material layer attached to the base fabric layer, the staple fiber batt material layer includes polymeric stable fibers uniformly blended with low elasticity staple fibers having a modulus of elasticity that is less than 25% of a modulus of elasticity of the polymeric stable fibers, the polymeric staple fibers and the low elasticity staple fibers consisting of fibers having a dtex of at least about 1.1 to about 44.

6. The press felt of claim 5, wherein the low elasticity staple fibers comprise regenerated cellulosic staple fibers.

7. The press felt according to claim 5, wherein the polymeric staple fibers and the low elasticity staple fibers have an approximately equal size.

8. The press felt according to claim 5, wherein the polymeric staple fibers are comprised of nylon.

9. The press felt according to claim 5, wherein the staple fiber batt material layer is comprised of between 20% to 80% by weight of the low elasticity staple fiber and from 80% to 20% by weight of the polymeric staple fiber.

10. The press felt according to claim 5, wherein the staple fiber batt material layer is comprised of between 50% to 80% by weight of the low elasticity staple fiber and from 50% to 20% by weight of the polymeric staple fiber.

11. The press felt according to claim 5, wherein the staple fiber batt material layer is comprised of about 50% by weight of the low elasticity staple fiber and about 50% by weight of the polymeric staple fiber.

12. The press felt according to claim 5, wherein the staple fiber batt material layer comprises a plurality of layers of staple fiber batt material, the low elasticity staple fibers being located at least on a paper support side of the press felt.

* * * * *

UNITED STATES PATENT AND TRADEMARK OFFICE
CERTIFICATE OF CORRECTION

PATENT NO.       : 7,132,036 B2
APPLICATION NO.  : 10/918028
DATED            : November 7, 2006
INVENTOR(S)      : Despault et al.

It is certified that error appears in the above-identified patent and that said Letters Patent is hereby corrected as shown below:

ON THE TITLE PAGE
(56), U.S. PATENT DOCUMENTS, page 1, right column, delete line 1, and insert therefor --3,392,079  A  7/1968  Fekete--.

IN THE SPECIFICATION
At column 2, line 63, before the word "fibers", delete "stable" and insert therefor --staple--.

At column 2, line 66, before the word "fibers", delete "stable" and insert therefor --staple--.

At column 3, line 31, after the word " "down" ", delete "top" and insert therefor --"top"--.

At column 4, line 33, before the word "fibers", delete "stable" and insert therefor --staple--.

At column 5, line 27, after the words "of a", delete "bend" and insert therefor --blend--.

At column 5, line 30, before the word "fiber", delete "stable" and insert therefor --staple--.

At column 7, line 35, before the word "fiber", delete "stable" and insert therefor --staple--.

UNITED STATES PATENT AND TRADEMARK OFFICE
CERTIFICATE OF CORRECTION

PATENT NO.         : 7,132,036 B2
APPLICATION NO.  : 10/918028
DATED              : November 7, 2006
INVENTOR(S)        : Despault et al.

It is certified that error appears in the above-identified patent and that said Letters Patent is hereby corrected as shown below:

At claim 5, column 8, line 30, before the word "fibers", delete "stable" and insert therefor --staple--.

At claim 5, column 5, line 34, before the word "fibers", delete "stable" and insert therefor --staple--.

Signed and Sealed this

Twenty-seventh Day of May, 2008

JON W. DUDAS
*Director of the United States Patent and Trademark Office*